May 16, 1961 P. W. TURNER 2,984,476
FLUID PRESSURE SYSTEMS AND APPARATUS
Filed June 15, 1959
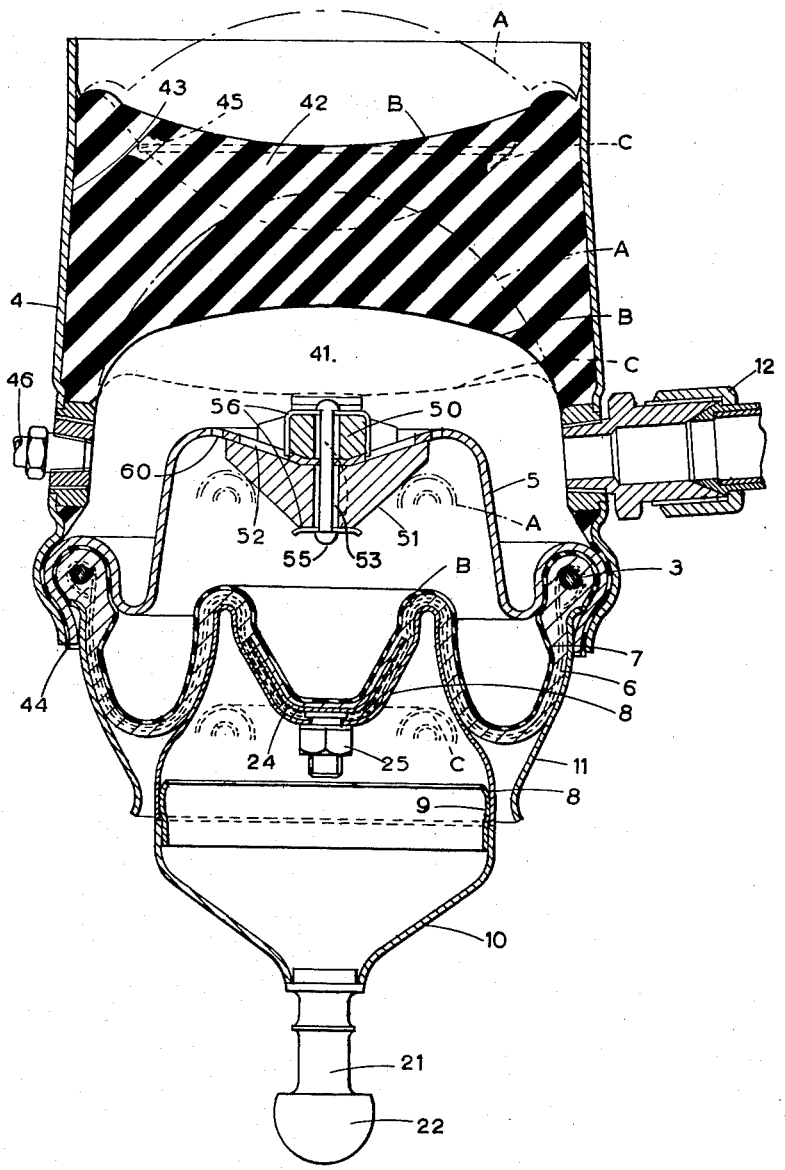
INVENTOR
PHILIP WILSON TURNER
BY
Shoemaker & Mattare
ATTORNEYS

United States Patent Office 2,984,476
Patented May 16, 1961

2,984,476

FLUID PRESSURE SYSTEMS AND APPARATUS

Philip Wilson Turner, Cambridge, England, assignor to Moulton Developments Limited, Bradford on Avon, Wiltshire, England Filed June 15, 1959, Ser. No. 820,490

Claims priority, application Great Britain Sept. 30, 1958

8 Claims. (Cl. 267—35)

This invention relates to fluid pressure systems and apparatus and has for its object to provide an improved spring to carry a sprung load on a liquid under pressure.

According to the present invention a spring of the type above referred to includes a displacer unit of the kind comprising a fluid filled hermetically sealed assembly including a piston and a cylinder bridged by a flexible diaphragm, wherein there is provided within the same housing a fluid filled chamber of variable volume having an elastic wall so arranged that when the piston displaces fluid from the cylinder into the chamber, the elastic wall is resiliently deformed.

The chamber of variable volume is located adjacent the cylinder and is connected thereto by apertures or ports in the walls of the latter and there is provided a damper valve controlling the flow of fluid to and from the cylinder through said ports.

The damper valve comprises a pair of oppositely acting rubber flaps each having a pair of apertures and being disposed substantially at right angles to one another on opposite sides of the wall of the cylinder which latter has two pairs of ports controlled by the respective valve flaps. Preferably there are also provided bleed orifices allowing limited flow between the chamber and the cylinder.

The chamber of variable volume is cylindrical or frusto conical in shape and has a body of rubber or rubber-like material of generally similar shape bonded to its cylindrical or frusto conical walls, the base and crown of the said body being free so that it forms the elastic wall of the chamber.

Preferably the rubber body tapers in thickness from its bonded portion to its axis or centre, i.e., it is thick at its outside and thin at its middle.

Such a spring, as above described, may appropriately be used in a vehicle wheel suspension to operate between the sprung structure and the wheel, in which case the chamber of variable volume may be apertured and arranged for a conduit connection with the corresponding chamber of a similar unit located at the other wheel of the vehicle on the same side.

The flexible diaphragm, employed in the displacer unit is of reinforced rubber or rubber-like material, and is clamped at its outside to the cylinder by its edge, which is beaded, but is continuous across the rest of its surface without being interrupted by a central hole or inner bead.

The diaphragm is essentially conically concave in shape in its free condition, that is to say before fitment in the unit, but has a portion adapted to fit on top of the piston whose upper surface is generally M-shaped in cross-section. The diaphragm is demountable from the piston and may have a dowel in the form of a rubber plug, moulded to its underside to locate it in the cavity of the piston. Alternatively, the diaphragm may be securely fastened to the piston by a bolted connection.

A relatively thin and impermeable separate liner is either moulded into the inner surface of the diaphragm or moulded in the shape of the diaphragm and trapped on assembly of the displacer unit to lie in contact with such inner surface. This liner is preferably made of a synthetic rubber such as butyl.

The shape of the piston enables a damper valve assembly to be so positioned that it lies within the cavity of the piston when the latter is in the full bump position.

One embodiment of the invention will now be described with reference to the accompanying drawing in which is shown a sectional side view of a preferred embodiment of the invention, designed to be employed in a vehicle suspension and employing a rubber body as the wall of the chamber of variable volume.

Referring now to the drawing, the displacer unit comprises a housing or cylinder formed essentially by two pressings 4 and 5. A piston 8 has an upper surface which is generally M-shaped in cross-section and at the centre of such upper surface the apex of the diaphragm 6 is attached. The shape of the piston enables a damper valve assembly to be so positioned that it lies within the cavity of the piston when the latter is in the full bump position. The pressing 4 will suitably be mounted on the sprung structure while the piston 8 will be connected to the wheel. The piston 8 is welded to a metal junction ring 9 which latter is in turn welded to a cup-shaped metal member 10 having a depending leg 21 having at its lower end a ball 22 for a ball-jointed connection with the wheel supporting arm (not shown). The diaphragm 6 is formed with a reinforcing conical metal inlay 24 and is bolted on to the piston 8 at 25.

The edge of the pressing 5 which forms the wall of the cylinder of the displacer unit, is spun over to trap the bead of the diaphragm 6 and an impermeable liner 7 securely in place. A skirt 11 prevents the diaphragm being overstressed by being spread outwardly when in the full rebound position as represented when the piston is at C.

The pressing 4 is attached at its upper end to the sprung structure of the vehicle or the like (not shown) and serves as a housing for both the displacer unit assembly and the chamber of variable volume 41 whose elastic wall is formed by a body of rubber or rubber-like material generally designated 42.

The body 42 is bonded at 43 to the inner surface of the pressing 4, which latter tapers in diameter from its base to its top and is slightly reduced in diameter by rolling or other means after the bonding operation in order to relieve stresses in the rubber due to contraction on cooling after bonding. The rubber body 42 tapers in thickness from its periphery bonded at 43 to its centre, and is formed with a thin rubber skin 44, bonded to the metal, which is trapped between the pressings 4 and 5 when the former is spun over, and which, being part of the rubber body 42, forms a fluid seal for the chamber 41. A cusp groove 45 is formed in the crown of the body 42 to locate cusping on deformation. The chamber 41 is provided with a valve 46, by which the operating fluid may be replenished, and in the case of a vehicle suspension of the conjugate type as described in either of the specifications of co-pending applications Serial Nos. 544,001, now Patent No. 2,966,366 issued December 27, 1960, or 813,- 564 the chamber may be connected to the corresponding chamber of a similar device located at another wheel of the vehicle on the same side. The interconnecting means may be either a rigid pipe or one capable of resilient expansion under internal hydraulic pressure, which pipe will be connected by the outlet 12 to the interior of the chamber 41.

The valve comprises a pair of rubber flaps 50 and 51 respectively controlling pairs of apertures 52 and 53 which are located at right angles to one another in the pressing 5. The valve flaps are located by a central spigot 55 and washers 56, the flap 50 prevents exit of the operating fluid from the chamber 41 by obturating the apertures 52, while the flap 51 prevents the passage of fluid in the opposite direction by obturating the apertures 53. Bleed orifices 60 allow flow to and from the chamber 41 and their diameter may be varied to suit the degree of damping required.

The operation of the device when employed to operate between the sprung structure of a vehicle and a wheel supporting arm is as follows:

The static position of the device is represented at B and in this position a state of equilibrium obtains the weight of the vehicle being supported through the medium of the fluid by the spring 42. When the wheel passes over a road inequality or when the vehicle is cornered such that the effective weight on that wheel is increased the piston and diaphragm are moved upwardly and fluid is displaced through the valve into the chamber 41 whose resilient wall, which is formed by the body of rubber 42, resists such influx of fluid. This resistance to upward movement by the piston in the bounce mode is implemented by the form of the piston and diaphragm which are so shaped and arranged that the higher they travel so their effective cross-sectional area increases and vice versa. The full bump, static, and full rebound positions of the components are indicated at A, B and C respectively. The valve 10 damps the flow of fluid to and from the chamber 41 thereby reducing undesirable oscillation to a minimum and eliminating the need for conventional shock absorbers on a vehicle fitted with this suspension device.

It will be appreciated that the tendency for a suspension employing the invention to return to the static position may be increased by a suitable arrangement of the suspension geometry such as described in the specification of co-pending application Serial No. 813,564.

By the present invention a combined spring and displacer unit is obtained which is simple in construction and operation and which may be economically produced.

I claim:

1. A combined spring and displacer unit, connectable between two elements and resisting relative movement between such elements, comprising a shaped piston connected to one of said elements and a sealed chamber filled with liquid, the walls of such chamber being partially constituted by a hollow rigid housing member connected to the other of said elements, one end of which housing member is closed by means including an impermeable body of resilient material, while the other end of the hollow rigid member is closed by a flexible diaphragm connected to said piston, and wherein a partition wall divides the chamber into two sections, one section constituting a chamber of variable volume closed by said resilient body and a second section forming a pump chamber frontally closed by said partition wall and rearwardly closed by said diaphragm, with valve means including at least one aperture in the partition wall for opening communication between the two sections of the chamber, when relative movement between the elements takes place.

2. A combined spring and displacer unit according to claim 1 wherein the valve means comprise at least one resilient flap arranged to cover at least one aperture in the partition wall and to prevent passage of liquid in one direction through such aperture and resiliently to resist liquid flow in the opposite direction.

3. A combined spring and displacer unit according to claim 1, wherein the housing member is circular in shape and has the body of resilient rubber-like material, bonded to its cylindrical or frusto conical walls, the base and crown of said body being free so that it forms an elastic wall for the chamber.

4. A combined spring and displacer unit according to claim 3, wherein the resilient body is generally lenticular in shape and tapers in thickness from its bonded portion to its axis of symmetry.

5. A combined spring and displacer unit according to claim 1, wherein the diaphragm employed in the displacer unit is of rubber-like material and is clamped at its outside by its edge, but is continuous over the rest of its surface.

6. A combined spring and displacer unit according to claim 5 wherein the diaphragm is conically concave in shape in free condition before fitment in the displacer, and has a portion adapted to fit on top of the piston.

7. A combined spring and displacer unit according to claim 1 wherein the upper surface of the piston is substantially M-shaped in cross-section.

8. A combined spring and displacer unit according to claim 1 and including also apertures in the partition wall which allow fluid communication between the two sections of the chamber.

References Cited in the file of this patent

UNITED STATES PATENTS

| | | |
|---|---|---|
| 2,318,437 | Vickers | May 4, 1943 |

FOREIGN PATENTS

| | | |
|---|---|---|
| 728,501 | Germany | Nov. 27, 1942 |
| 183,609 | Austria | Oct. 25, 1955 |
| 1,148,710 | France | June 24, 1957 |
| 1,152,494 | France | Sept. 2, 1957 |
| 811,748 | Great Britain | Apr. 8, 1959 |